United States Patent [19]

Albert

[11] 3,892,905

[45] July 1, 1975

[54] COLD WATER SOLUBLE PLASTIC FILMS

[75] Inventor: Robert Eyer Albert, Wilmington, Del.

[73] Assignee: E. I. du Pont de Nemours & Company, Wilmington, Del.

[22] Filed: Feb. 2, 1973

[21] Appl. No.: 329,071

Related U.S. Application Data

[63] Continuation-in-part of Ser. No. 129,566, March 31, 1971, abandoned, which is a continuation-in-part of Ser. No. 63,287, Aug. 12, 1970, abandoned.

[52] U.S. Cl. ............... 428/220; 206/84; 206/484; 220/DIG. 30; 252/90; 260/29.6 WB; 260/895; 206/484;84
[51] Int. Cl... B65d 81/00; B32b 27/08; B32b 27/06
[58] Field of Search .......... 161/165, 244, 247, 252; 260/895, 29.7 WA; 117/76 F, 138.8 PV; 220/DIG. 30; 252/90

[56] References Cited
UNITED STATES PATENTS

| | | | |
|---|---|---|---|
| 2,580,414 | 1/1952 | Duffey | 206/56 AA |
| 2,750,027 | 6/1956 | Cummings | 220/DIG. 30 |
| 3,105,058 | 9/1963 | O Sugi et al. | 260/895 |
| 3,155,632 | 11/1964 | Matsubayashi et al. | 260/895 |
| 3,186,869 | 6/1965 | Friedman | 117/138.8 PV |
| 3,198,740 | 8/1965 | Dunlop et al. | 220/DIG. 30 |
| 3,279,511 | 10/1966 | Griffin | 220/DIG. 30 |
| 3,374,195 | 3/1968 | Bianco et al. | 260/29.6 |
| 3,507,846 | 4/1970 | Haas | 260/895 |
| 3,528,921 | 9/1970 | Gray | 252/99 |
| 3,574,153 | 4/1971 | Sirota | 260/895 |

Primary Examiner—George F. Lesmes
Assistant Examiner—Alan T. McDonald

[57] ABSTRACT

Films, 0.0005 to 0.010 inch thick, which are readily soluble in cold water may be made from a polymer mixture of polyvinyl alcohol or polyvinyl pyrrolidone having a molecular weight average of more than 120,000 and a different polymer, polyvinyl alcohol or polyvinyl pyrrolidone having a molecular weight of less than 90,000.

6 Claims, No Drawings

COLD WATER SOLUBLE PLASTIC FILMS

CROSS REFERENCE TO RELATED APPLICATIONS

This application is a continuation-in-part of my now abandoned application Ser. No. 129,566, filed Mar. 31, 1971, which is a continuation-in-part of abandoned application Ser. No. 63,287, filed Aug. 12, 1970.

BACKGROUND OF THE INVENTION

Many commonly used chemicals are produced and sold in pulverulent form but slurried, dispersed or dissolved in water when used by the consumer. Examples of these materials are pesticides, specifically, insecticides, herbicides, nematicides, and fungicides which are applied as a water spray, cleaning products such as laundry detergents, bleaches, and caustic cleansers which are dissolved in wash water, and process chemicals such as carbon black and activated charcoal which may be slurried in water and pigments and dyes which are dissolved or dispersed.

There are several problems associated with the use of these types of products. The first of these problems is exposure of the user and his immediate surroundings to the chemical. Opening a package of finely ground material, measuring an amount of the material and transferring the measured amount from the package to the equipment where the material is contacted with water can generate airborne dust which contacts the user and contaminates the area. A pesticide dust could be irritating to the eyes and mucous membranes of the nose and throat of the user. A herbicide dust could damage plants in the area where the packages are opened. Dusts of pigments or activated charcoal present severe clean-up problems.

The second problem in using common pulverulent chemicals is accuracy of measurement. Clearly, overcharging of expensive materials is costly. Use of a weak solution of a herbicide will not properly control the undesired plant species. Use of too strong a solution of the same material may damage some desired plants as well as the undesired weeds. It is frequently extremely difficult to accurately measure and transfer powdery materials in areas exposed to wind or materials which have become compacted and lumpy in their packages.

Finally, after the chemical has been used, the user is faced with the problem of disposing of the package in which the chemical was delivered. It may contain residual amounts of a material which is a pollution problem, potentially hazardous to humans, harmful to plants and animals, or merely unpleasant and unsightly.

It is an object of this invention to provide polymeric films, rapidly soluble in cold water, which may be used as packages for pulverulent materials. The film package containing the material can be directly charged to the water, thus eliminating problems of the user's contact with the chemical in the package, exact measuring and container disposal. As used herein the term "film" is limited to single layer structures and excludes laminates having multiple layers.

The water soluble packages made from polymeric films based on polyvinyl alcohols, aliphatic polyethers or polyethylene glycols currently available are soluble in water at above about 90°F. In water at temperatures below 75°F. films and packages made from many of these polymers do not truly dissolve, but disintegrate into small gel-like particles which are resistant to complete dissolution. These gel-like particles tend to deposit on vessel walls, piping, pumps and valves and restrict flow through screens and nozzles. The polymeric films of this invention are rapidly and completely soluble in water at a temperature as low as 40°F. without forming gel-like particles of undissolved or undispersed polymer.

Alles, U.S. Pat. No. 3,458,311 teaches an oxygen barrier "stratum" (coating) of polyvinyl alcohol and polyvinyl pyrrolidone. In fact Alles teaches that the protective stratum "is so thin that it cannot be stripped mechanically unsupported, in one piece from the photopolymerizable layer." Furthermore the reference does not suggest the ratios and molecular weight limits of the polymers required for cold water soluble films with practical strength and flexibility for packaging. Another reference which teaches combinations of polyvinyl alcohol and polyvinyl pyrrolidone is the General Anilin and Film Technical Bulletin 7543-113 (1964). This reference does not report cold water soluble, unsupported film.

SUMMARY OF THE INVENTION

Cold water soluble packages may be made using a 0.0005 to 0.010 inch thick film comprising from 10 to 75 parts by weight of a polymer having a weight average molecular weight greater than about 120,000 selected from the group consisting of polyvinyl alcohol and polyvinyl pyrrolidone and from 90 to 25 parts by weight of a different polymer having a weight average molecular weight of less than about 90,000 selected from the group consisting of polyvinyl alcohol and polyvinyl pyrrolidone. The term "different polymer" indicates that when the higher molecular weight polymer is polyvinyl alcohol, the lower molecular weight polymer is polyvinyl pyrrolidone. Similarly, when the high molecular weight polymer is polyvinyl pyrrolidone, the lower molecular weight polymer is polyvinyl alcohol. The film can contain from 0 to 100 parts by weight of a hydrophilic plasticizer or humectant per 100 parts polymer. Packages prepared from these films are readily soluble in cold water, thus eliminating the need for water heating equipment. Such packages protect the user from contact with the contents of the package, provide premeasured amounts of the contents and dissolve completely in water, thus eliminating any used package disposal problem.

DESCRIPTION OF THE PREFERRED EMBODIMENTS

The films of this invention are from 0.0005 to 0.010 inch thick. However, to obtain most rapid water solubility while still retaining sufficient strength, films of about 0.001 to 0.005 inch thick are preferred.

The films of this invention comprise from 0 to 100 parts by weight plasticizer per 100 parts polymer, from 10 to 75% by weight of a polymer having a weight average molecular weight greater than about 120,000 selected from the group consisting of polyvinyl alcohol and polyvinyl pyrrolidone and from 90 to 25% by weight of a different polymer having a weight average molecular weight of less than about 90,000 selected from the group consisting of polyvinyl alcohol and polyvinyl pyrrolidone. Films containing a lower molecular weight polymer having a molecular weight of less than 50,000 are preferred. As used herein, the term polyvinyl alcohol means hydrolyzed polyvinyl acetate, the degree of hydrolysis being from 87 to 99 mol percent.

Solution viscometry provides a rapid and convenient technique for estimating the weight average molecular weight ($\overline{M}w$) of the polyvinyl alcohol and polyvinyl pyrrolidone resins.

The following empirical equations may be used for polyvinyl alcohol within the above range of hydrolysis:

$$Pw^{0.61} = 68.8 \, (\log \nu_{4\%})^{1.054}$$

where:

$\nu_{4\%}$ = the viscosity in centipoises (20°C) of a 4% aqueous solution;
$Pw$ = weight average degree of polymerization; and
$\overline{M}w = 44.05 \, Pw$.

Similar equations relating weight average molecular weight and solution viscosity for polyvinyl pyrrolidone have been developed. See H. P. Frank and G. B. Levy, *J. Polymer Sci.*, 10, 371 (1953).

If a greater percentage of the higher molecular weight polymer is used, the dissolving rate of the film is decreased. If a greater percentage of the lower molecular weight polymer is used, the film strength is decreased. The preferred range of concentration of the higher molecular weight polymer in the film is 20 to 50% and particularly preferred are films having 25 to 35% of the higher molecular weight polymer. A particular preferred film contains 30% polyvinyl pyrrolidone of molecular weight about 360,000 and 70% polyvinyl alcohol with a molecular weight of about 21,000.

The films of this invention are rapidly and completely soluble in cold water. At elevated temperatures in quiescent water at 90°F. complete solubility is achieved in only several seconds. At lower temperatures, 70°F., complete solubility is achieved in about 10 seconds. In cold water, at below 50°F. and even as low as 40°F., such as would be available for large scale agricultural use in Spring or Fall, complete solubility of these films is achieved in gently agitated water in 1 minute or less. The greater the proportion of the higher molecular weight polymer, the slower the films dissolve in cold water. Above about 90% by weight of the higher molecular weight polymer fraction, the dissolving time in water at temperatures below about 45°F. is greater than about 1 minute, and a tendency to form the gel-like particles which resist complete dissolution for extended times is evident. The films of this invention also exhibit sufficient strength and flexibility for fabricating into packages which can be subsequently handled, provided the package is protected from contact with moisture or atmospheres of high relative humidity. Tensile strengths of films range from about 2000 psi to 10,000 psi measured at a relative humidity 50% with the films containing higher proportions of the high molecular weight polymer being stronger and exhibiting higher levels of elongation of 10 to 20% and greater flexibility. Films containing the lower amounts of high molecular weight polymer exhibit a tendency to become brittle when exposed to air, at low relative humidity, such as 30%, or less, indicating the strong plasticizing effect of water on these films. In order to minimize the possibility of packages made from the film becoming brittle on storage, it is quite practical to make and fill the packages in an atmosphere above 30% relative humidity and immediately enclose them in a moistureproof overwrap. An alternate method for preventing excessive brittleness under conditions of low relative humidity is to incorporate into the film hydrophilic organic or inorganic substances as plasticizers or humectants. The higher boiling, non-fugitive plasticizers are preferred (bp ≧ 150°C.).

The plasticizers include highly polar water-soluble organic compounds containing hydroxyl, amide, or amino groups, especially those commonly used in films of polyvinyl alcohol and polyvinyl pyrrolidine. Examples include polyhydric alcohols such as ethylene glycol, propylene glycol, glycerol, polyglycols, and sorbitol; amides such as urea, tetramethyl urea, N,N-dimethyl formamide-N,N-dimethylacetamide and lactams such as pyrrolidone carboxylic acids and salts; amines and amine salts such as ethanol or triethanol amine acetate. Water is an important plasticizer and consequently humectants, which promote water absorption also prevent excessive film brittleness, just as hydrophilic plasticizers do. For the purposes of this case, the term "plasticizer" is intended to include humectants. Examples of useful humectants are metallic or ammonium salts commonly used with polyvinyl alcohol and polyvinyl pyrrolidone such as ammonium, sodium, or potassium thiocyanate and acetate; halides such as ammonium, sodium, or potassium bromide, and magnesium chloride. Preferred plasticizers are dimethylformamide, dimethylacetamide, ethylene glycol, propylene glycol and water-soluble polyglycols. Plasticizers improve the flexibility and resistance to cracking on flexing of the mixed polymer films of this invention. However, increasing the concentration of plasticizer in the film increases the sensitivity of the film to moisture. At relative humidities above about 50% handling film containing more than about 15 parts of plasticizer per 100 parts of polymer becomes difficult and the film tends to adhere strongly to itself and other surfaces. Conversely at humidities below 30% relative humidity and with less than 5% plasticizer, the films are not sufficiently tough for convenient operation on high speed automatic packaging machines. Thus as much as 100 parts plasticizer per 100 parts polymer may be used, but concentrations of less than 35 parts plasticizer per 100 parts polymer are preferred and concentrations of from 5 to 15 parts plasticizer per 100 parts polymer are most preferred.

It is well known that water soluble, partially hydrolyzed granular polyvinylalcohol polymers are slow to dissolve in water. High viscosity gel-like particles form when the polymer is added to water. These tend to agglomerate into balls and lumps as large as one-half inch in diameter. In order to form a smooth, uniform gel-free solution, very high shear, intensive mixing for several hours is required. Under conditions of lower shear stress, even a longer mixing time up to 100 hours is required to produce a uniform solution. Surprisingly, however, it is now discovered that if the polyvinylalcohol polymer is added to a polyvinylpyrrolidone solution, the polyvinylalcohol dissolves rapidly. Under even rather mild shear stress conditions uniform smooth, gel-free solutions of the mixed polymer are formed in 10 to 30 minutes. Polyvinylpyrrolidone polymers alone dissolve quite rapidly in water, without formation of gel-like particles or agglomerates. Therefore, two methods are available for preparing the mixed polymer aqueous solutions: (1) prepare a solution of polyvinylpyrrolidone into which is dissolved the polyvinyl alcohol polymer, or (2) dissolve in water a blended mixture of dry granular polyvinylalcohol and polyvinyl pyrrolidone polymers. The former method is especially useful when using a polyvinylpyrrolidone solution supplied by the manufacturer whereas the latter method is useful when granular polymers are available.

The films of this invention can be made by doctor knife casting solutions of the polymers onto 0.005 inch thick Mylar polyester film supported on a flat glass plate. The dried cast films can be readily stripped from the polyester. They cannot be stripped from polyethylene or glass. Teflon polyfluorocarbon is not a suitable casting surface since it is not readily wettable by the aqueous polymer solution.

Good knife casting performance requires a casting solution viscosity of from about 100 to 1500 poises. Aqueous solutions of the polymer mixtures of this invention having a solids content of from about 10 to 50%, depending on average molecular weight, usually fall within the desired viscosity range.

The cast films may be dried at room temperature, or temperatures up to about 90°C. and stripped from the casting surface. Satisfactory films can be prepared by simple drying in air at about 70°F. and 40 to 50% relative humidity for about 6 hours.

In addition to the method of doctor knife casting, other conventional methods can be used for making the films of this invention. For example, concentrated solutions of 50 to 80% solids can be extruded and dried using conventional batch or continuous equipment. It is often convenient to use a Mylar polyester film as a support and interleaf in making rolls of film.

Packages may be made from the films of this invention on many of the commercially available types of plastic film package making machinery. In the laboratory, bags may be made from the dry films of this invention in the following manner. Carefully wet a ¼ inch band along three edges of a rectangular piece of the film. Place a second piece of film of the same size as the first piece over the first piece and exert mild pressure along the wetted edges. A bag with three sealed edges will result. It may be filled with a powder and the fourth edge sealed in the same manner as the other three. Heat sealing may also be used with temperatures of about 120°–140°C. and pressures of about 5–25 lb/in².

In order to protect the water-soluble package during storage, shipping and handling, a moistureproof overwrap must be provided to prevent damage from atmospheric moisture such as high humidity, rain, and dew and from accidental contact with water by splashing or wet hands. This moistureproof overwrap can be provided for either individual packages or groups of packages, whichever appears to be most desirable for the individual case. Of course, once the overwrap is removed, the soluble packages must be protected from water contact or must be used promptly.

Suitable materials for the overwrap are the polyolefin films such as polyethylene or polypropylene, Kraft paper moistureproofed with polyethylene, moistureproof cellophane, glassene, metal foils, polyester, polyvinyl chloride, polyvinylidene chloride or waxed paper and combinations of these materials as in laminates. The choice of the overwrap would be dictated by costs and strengths required.

The cold water soluble packaging films of this invention are useful for packaging of pulverulent, dusty, noxious, irritating and/or toxic materials which must be dispersed, slurried, suspended or dissolved in water or mixed solvents, one of which is water. Examples of chemicals which are usefully packaged in premeasured portions in these films are pesticides, specifically insecticides, herbicides, nematicides and fungicides, cleaning products such as laundry detergents, bleaches and caustic products, process chemicals such as carbon black, activated charcoal, pigments and dyes, foodstuffs and food additives. Other uses involve preparing premeasured portions of incompatible materials such as flour and oil; benomyl and maneb fungicides; and the like in separate water soluble film packages and overwrapping these separate packages in a single moistureproof packaging material. When used, the separate water soluble packages containing the premeasured portion of additive or chemicals are added simultaneously to the liquid in suitable mixing equipment, thus preventing premature reaction or mixing and eliminating sources of measuring errors.

The following Examples and related test procedures further illustrate this invention.

Film Dissolving Rate

The rate of dissolution of dried film is measured by immersing quickly to a depth of 2 inches in water at 40°–45°F. a 1 inch wide by 4 inches long film strip. A 0.6 g weight (one No. 1 "Gem" paper clip) is attached to the end of the strip to provide a slight load to sink and hold the film strip straight. The time of immersing is noted and the time when film strip dissolves leaving a sharp clean line at the water surface with no stringers or blobs apparent in the water. The time difference is noted as the dissolving time, and times less than 1 minute per 0.001 inch of thickness are judged to be acceptable for water soluble packaging film.

Flexibility Test

Flexibility of the water soluble films is determined by creasing a 1 inch wide × 4 inches long film strip by folding the film upon itself in the 4 inch direction and pressing the crease with a fingernail to form a sharp fold. The film is judged satisfactory in regard to flexibility if no crack appears at the ends of the crease at 20–50% relative humidity and 70°F.

EXAMPLE 1

A stock solution containing 33 weight percent of polyvinyl alcohol (PVA) polymer is prepared from "Elvanol" 51-05, 87.7–89.2 mole percent hydrolyzed polyvinyl acetate (E. I. du Pont de Nemours & Company) polymer of weight average molecular weight of about 21,800, by slowly adding 330 grams of the polymer to 670 grams of water maintained at 50°–60°C., while rapidly stirring the mixture. After several hours the polymer solution is clear and gel-free and has a viscosity of about 500 cp. The solution is set aside to cool and is stored in a sealed bottle.

To 67.5 g of the stock PVA solution is added 112.5 g. of a 20% by weight polyvinyl pyrrolidone solution, PVP K-90, weight average molecular weight of about 360,000 obtained from GAF Corporation, Grasselli, N.J., and 100 g of water to adjust the mixture solutuon to about 500 cp. The mixed polymer solution is stirred for several minutes until homogeneous.

Films are doctor knife cast onto 0.010 inch thick Mylar polyester film supported on a flat glass plate using a casting slot 8 inches long × 0.010 inch wide. Cast films are 8 inches wide × 24 inches long × 0.010 inch thick. The films are air dried at room temperature, about 27°C., for several hours on the Mylar film until they were no longer "tacky" to touch. The films are then finish dried by placing them, still on the Mylar film support, into an air oven at 90°C. for about 20–30 minutes.

After drying, the films on the support are removed from the oven and cooled. The mixed polymer films are stripped from the Mylar support by lifting one edge with the corner of a sharp razor blade and carefully pulling the film free. The dry film is 0.0015 inch thick.

The dry film is transferred to an 18 inches × 30 inches polyethylene bag and the bag sealed to protect the film from moisture and atmospheric humidity.

A portion of the dried mixed polymer film is removed from the bag and 12 strips, 4 inches long and 1 inch wide, are cut from this portion. The remaining film is resealed in the polyethylene bag. The film strips are placed in a second polyethylene bag. Six of the film strips are used for solubility tests, and six are used for flexibility tests, as described above. The film strips dissolve in less than 1.0 minute and exhibit excellent behavior in the flexibility test. Other physical properties of the mixed polymer film are measured at 75°F. and 35% relative humidity as: tensile strength - 4,000 psi; initial modulus - 410,000 psi; and tear strength - 8 g.

Additional examples are shown in Tables 1 and 2. All films in these examples were prepared as in Example 1 using different polymer combinations. The data in Table 2 demonstrate the necessity of having two different polymers in the film to obtain satisfactory flexibility and dissolving rate.

flex resistance under severe stress of the water-soluble films.

Polymer Solution Preparation

Polyvinyl Alcohol

Polyvinyl alcohol solutions are prepared by slowly adding the pulverulant, granular polymer to rapidly stirred water. Rapid stirring is continued for several hours until the polymer solution is free of gel particles, during which time the temperature of the solution increases to about 50°C. When the polymer solutions are observed to be free of gel particles, they are transferred to a glass container, sealed and allowed to cool. The following solutions are prepared:

| Solution | Polyvinyl Alcohol Polymer | | Solution Preparation parts by weight | |
|---|---|---|---|---|
|  | Mol. Wt. | Source | Polymer | Water |
| A | 20,800 | Example 1 | 33 | 67 |
| B | 83,000 | Example 5 | 30 | 70 |

Polyvinyl Pyrrolidone

Polyvinyl pyrrolidone solution is that of Example 3, molecular weight of 360,000 and is used as received: 20 parts by weight of polymer to 80 parts by weight of water.

TABLE 1

| | High Mol. Wt. Polymer | | | Low Mol. Wt. Polymer | | | Properties of Film 0.001" Thick | | |
|---|---|---|---|---|---|---|---|---|---|
| Example | Type | Mol.wt. (wt.avg.) | Wt. % in dry film | Type | Mol.wt. (wt.avg.) | Wt. % in dry film | Dissolving Time, min. | Complete Dissolution | Flexibility, 180° Bend |
| 2 | PVA | 122.6 M | 50 | PVP | 40 M | 50 | 1 | yes | Pass |
| 3 | PVP | 360 M | 75 | PVA | 20.8 M | 25 | 0.4 | yes | Pass |
| 4 | PVP | 360 M | 25 | PVA | 20.8 M | 75 | 0.5 | yes | Pass |
| 5 | PVP | 160 M | 75 | PVA | 83 M | 25 | 0.35 | yes | Pass |
| 6 | PVA | 127.6 M | 30 | PVP | 40 M | 70 | 0.08 | yes | Pass |
| 7 | PVP | 160 M | 67 | PVA | 20.8 M | 33 | 0.1 | yes | Pass - sticky |
| 8 | PVP | 160 M | 50 | PVA | 20.8 M | 50 | 0.1 | yes | Pass - sticky |

PVP = polyvinyl pyrrolidone obtained from GAF Corp., Grasselli, N.J.

| Commercial designation | Wt. Avg. Mol. Wt. |
|---|---|
| K-90 | 360 M |
| K-60 | 160 M |
| K-30 | 40 M |

PVA = Polyvinyl alcohol, hydrolyzed polyvinyl acetate
Du Pont "Elvanol" — commercial designation —

| | | Mol % Hydrolyzed |
|---|---|---|
| 50–42 | 122.6 M | 87.2–89.2 |
| 51–05 | 20.8 M | 87.7–89.2 |
| 52–22 | 83.0 M | 87.2–89.2 |

TABLE 2

| | High Mol. Wt. Polymer | | | Low Mol. Wt. Polymer | | | Properties of Film 0.001" Thick | | |
|---|---|---|---|---|---|---|---|---|---|
| Example | Type | Mol.wt. (wt.avg.) | Wt. % in dry film | Type | Mol.wt. (wt.avg.) | Wt. % in dry film | Dissolving Time, min. | Complete Dissolution | Flexibility, 180° Bend |
| 9 | PVP | 360 M | 50 | PVP | 40 M | 50 | 0.8 | yes | Fail |
| 10 | PVP | 360 M | 100 | None | | | 7.5 | no | Pass |
| 11 | PVP | 160 M | 100 | None | | | 1.5 | yes | Fail |
| 12 | PVP | 40 M | 100 | None | | | Too brittle to obtain sample | | Fail |
| 13 | PVA | 122.6 M | 50 | PVA | 83 M | 50 | 2.5 | no | Pass |

EXAMPLE 14

This example shows the effect of plasticizers on the

The following mixed polymer plus plasticizer solutions are prepared and used to cast films with a 0.015 inch casting slot and dried as in Example 1:

| Film | Casting Solution Polyvinyl Alcohol Solution | Polyvinyl Alcohol Parts by Weight | PVP Solution parts by weight | Water parts by weight | Plasticizer Type | Plasticizer Parts by weight |
|---|---|---|---|---|---|---|
| 1 | A | 212 | 150 | 138 | glycerine | 20 |
| 2 | A | 242 | 100 | 158 | glycerine | 10 |
| 3 | A | 272 | 50 | 178 | glycerine | 10 |
| 4 | B | 266 | 100 | 134 | glycerine | 5 |
| 5 | B | 266 | 100 | 134 | glycerine | 10 |
| 6 | B | 200 | 200 | 100 | glycerine | 5 |
| 7 | B | 200 | 200 | 100 | glycerine | 10 |
| 8 | B | 200 | 200 | 100 | glycerine | 20 |
| 9 | A | 212 | 150 | 138 | ethylene glycol | 5 |
| 10 | A | 212 | 150 | 138 | ethylene glycol | 10 |
| 11 | A | 212 | 150 | 138 | ethylene glycol | 20 |
| 12 | A | 242 | 100 | 158 | ethylene glycol | 5 |
| 13 | A | 242 | 100 | 158 | ethylene glycol | 10 |
| 14 | A | 272 | 50 | 178 | ethylene glycol | 5 |
| 15 | A | 272 | 50 | 178 | ethylene glycol | 10 |
| 16 | B | 266 | 100 | 134 | ethylene glycol | 5 |
| 17 | B | 200 | 200 | 100 | ethylene glycol | 5 |
| 18 | A | 212 | 150 | 138 | none | 0 |

The dried films are removed from the Mylar support and immediately placed in polyethylene bags.

The dissolving rate and resistance to flexing are determined for each of the films. Resistance to flexing under stress is determined by conditioning for 24 hours at 35% relative humidity, a 4 × 7 inch film to be tested. One inch wide strips along each of the 7 inch edges are clamped between two parallel rubber-faced jaws, one-half inch apart, and in the same plane. The 2 inch width of unclamped film forms a "U" shape between the jaws. The assembly is arranged to rotate the common plane of the jaws at 60 rpm around a center line lying in the plane in the 4 inch direction of the film, and passing through the center of the closed jaws. One jaw is fixed. The second jaw, weighing 4 pounds, is arranged to slide freely maintaining parallelism with the ½ inch spacing from the fixed jaw and restrained only by the film under test. Thus each half revolution of the assembly, the movable jaw moves relative to the fixed jaw, removing the slack from the film specimen being tested, and producing a series of diagonal and parallel wrinkles in the film extending from jaw to jaw. When the plane of the jaws is vertical, a load of 4 lbs is applied to the film under test. The sliding jaw applies an initial shock load to the film each half revolution as it slides from one extreme position to the other. Each half revolution is counted as one stress-flex cycle. The test is terminated when the film sample breaks, allowing the movable jaw to strike a switch which interrupts the electrical power used to rotate the assembly. The results are as follows:

| Film | Composition, parts by weight PVA | PVP | Plast. | Thickness inches | Dissolving Time, min. | Stress-Flex Cycles to Failure |
|---|---|---|---|---|---|---|
| 1 | 70 | 30 | 20 | 0.0030 | 0.40 | 918 |
| 2 | 80 | 20 | 10 | 0.0020 | 0.57 | 492 |
| 3 | 90 | 10 | 10 | 0.0030 | 0.60 | 1474 |
| 4 | 80 | 20 | 5 | 0.0015 | 0.97 | 83 |
| 5 | 80 | 20 | 10 | 0.0020 | 0.67 | 470 |
| 6 | 60 | 40 | 5 | 0.0015 | 0.71 | 12 |
| 7 | 60 | 40 | 10 | 0.0020 | 0.44 | 76 |
| 8 | 60 | 40 | 20 | 0.0020 | 0.42 | 307 |
| 9 | 70 | 30 | 5 | 0.0025 | 0.64 | 162 |

-Continued

| Film | Composition, parts by weight PVA | PVP | Plast. | Thickness inches | Dissolving Time, min. | Stress-Flex Cycles to Failure |
|---|---|---|---|---|---|---|
| 10 | 70 | 30 | 10 | 0.0025 | 0.55 | 161 |
| 11 | 70 | 30 | 20 | 0.0020 | 0.68 | 110 |
| 12 | 80 | 20 | 5 | 0.0020 | 0.66 | 205 |
| 13 | 80 | 20 | 10 | 0.0020 | 0.60 | 142 |
| 14 | 90 | 10 | 5 | 0.0025 | 0.95 | 267 |
| 15 | 90 | 10 | 10 | 0.0015 | 0.88 | 506 |
| 16 | 80 | 20 | 5 | 0.005 | 0.87 | 243 |
| 17 | 60 | 40 | 5 | 0.0015 | 0.71 | 73 |
| 18 | 70 | 30 | 0 | 0.0010 | 0.51 | 0 |

EXAMPLE 15

This example is presented to demonstrate the effectiveness of essentially non-volatile plasticizers.

The following mixed polymer solution is prepared: To 200 parts by weight of the high molecular weight polyvinyl pyrrolidone solution of Example 14 are added 374 parts of water, thoroughly stirred. To this dilute solution of PVP is slowly added with rapid stirring 93.3 parts by weight of the granular low molecular weight polyvinyl alcohol polymer of Example 1. A smooth gel-free solution of mixed polymers results after only stirring 30 minutes. This is in contrast to the several hours which are required to prepare the same concentration solution by adding the polyvinyl alcohol to water using the same degree of stirring. Polyethylene glycol, Carbowax 400, Union Carbide Chemical Corporation, a low volatility plasticizer, is added to the mixed polymer solution.

The following solutions were prepared from which films are cast, as in Example 14:

| Casting Solution | Mixed Polymer Solution Parts by Weight | Plasticizer Parts by Weight |
|---|---|---|
| 1 | 500 | 5 |
| 2 | 500 | 10 |
| 3 | 500 | 15 |
| 4 | 500 | 20 |
| 5 | 500 | 30 |
| 6 | 500 | 0 |

The dried films are examined for solubility rate and resistance to flexure, as in Example 14. The following results are obtained:

| Film | Film Composition Parts by weight | | | Solubility Time, min./mil. | Flex-Stress Cycles to Fail |
|---|---|---|---|---|---|
| | PVA | PVP | Plast. | | |
| 1 | 70 | 30 | 5 | 0.60 | 15 |
| 2 | 70 | 30 | 10 | 0.57 | 40 |
| 3 | 70 | 30 | 15 | 0.54 | 80 |
| 4 | 70 | 30 | 20 | 0.50 | 150 |
| 5 | 70 | 30 | 30 | 0.45 | 450 |
| 6 | 70 | 30 | 0 | 0.65 | 0 |

These films exhibit much greater handling ease than those of Example 14, when exposed to relative humidities of 50% or higher.

EXAMPLE 16

Aqueous stock solutions of both 50 and 70 parts by weight of Elvanol 51-05 polyvinyl alcohol, wt. avg. M.W. 20.8 M (PVA) were prepared which contained 50 and 30 parts by weight of General Anilin & Film K-90 polyvinyl pyrrolidone (M.W. 360 M) respectively. Various plasticizers or humectants were dissolved in about 30 ml portions of the stock solutions by shaking or by stirring with a disc stirrer. Films were cast from the resulting homogeneous solutions, and tested. All fims were clear, homogeneous, flexible, and non-exuding. The results of the film dissolving rate test are shown in the following table:

| Plasticizer or Humectant | Parts by Weight PVA | Film Solubility Rate mins./mil. | Film Thickness, mil. |
|---|---|---|---|
| Union Carbide Carbowax 350[1] | 50 | 0.4 | 5.7 |
| Union Carbide butoxy triglycol | 50 | 0.4 | 6.8 |
| Glyco Ethosperse G-26[2] | 50 | 0.3 | 5.4 |
| Olin PG WS-5100[3] | 70 | 0.8 | 3.2 |
| Union Carbide polypropylene glycol 425 | 50 | 0.4 | 6.2 |
| Pfizer technical sorbitol | 70 | 0.5 | 2.5 |
| urea | 70 | 0.5 | 2.0 |
| magnesium chloride | 70 | 0.5 | 1.2 |
| ammonium thiocyanate | 70 | 0.4 | 2.5 |

[1] =methoxy polyethylene glycol
[2] =polyethylene glycol glyceride
[3] =butoxy ether of ethylene glycol - propylene glycol copolymer

EXAMPLE 17

Aqueous stock solutions as in Example 16 were prepared except that Elvanol 52-22 polyvinyl alcohol (PVA) (Wt. avg. M.W. 83.0M) was used in place of Elvanol 51-05. Sixty parts by weight of Carbowax 600 polyethylene glycol (Union Carbide) was then dissolved in 30 ml. portions of the solutions. The films resulting from casting these solutions were again clear, homogeneous, flexible, and non-exuding. The results of the film dissolving rate test are shown below:

| Parts by Weight PVA | Film Solubility rate mins./mil. | Film Thickness, mil. |
|---|---|---|
| 70 | 0.9 | 1.0 |
| 50 | 0.7 | 1.7 |

EXAMPLED 18

This example illustrates the preparation of a mixed polymer film for packaging of pesticides, the preparation of pesticides in water soluble film packages and combinations of soluble film packages of pesticides and moistureproof overwraps to protect the water soluble film packages.

Preparation of Mixed Polymer Casting Solution and Films

To 430 parts by weight of the polyvinyl pyrrolidone solution of Example 14 is added 1000 parts by weight of water and 43 parts by weight of glycerine. The mixture is thoroughly stirred to yield a smooth, uniform, dilute polymer solution. To the dilute solution is slowly added 200 parts by weight of the granular polyvinyl alcohol polymer of Example 1 with vigorous stirring. Stirring is continued for 30 minutes, allowing the temperature to rise to about 50°C. The solution is transferred to bottles, sealed, and allowed to cool.

In order to prepare bubble (pin-hole) free films, the solution is degassed by centrifuging 35 ml portions in polyethylene centrifuge tubes, eight portions at a time, using Sorvall Superspeed Centrifuge type SS3, manufactured by Ivan Sorvall, Inc., Newton, Conn., operating at 12,000 – 13,000 rpm for 10 minutes. Films are prepared from the centrifuged solutions, as in Example 14.

Preparation and Filling of Mixed Water-Soluble Polymer Film Packages

Envelope packages are prepared from the water soluble film by placing two rectangular sheets of the mixed polymer film face-to-face, so that the edges coincide and heat sealing three edges, using a Sentinel Pacemaker Heat-Sealer, Model 12-TP, manufactured by Packaging Industries, Hyannis, Mass., with a heating cycle of 1.5 seconds, and a cooling cycle of 2 seconds.

The soluble packages are filled by pouring the weighed pesticide powder into the previously prepared envelope, moistening about ¼ inch wide strip along the inner face of the unsealed open edge, vacuum-exhausting the air through a 1/16 inch diameter Teflon polytetrafluoroethylene tube after the open edge is closed, allowing about ½ inch length of the tube to extend into the envelope through the seal, withdrawing the tube while maintaining an essentially air-tight seal, and finally heat-sealing the fourth edge. These sealed water soluble packages are placed in the moistureproof overwrap described below.

Application of Moistureproof Overwrap

Envelope packages to serve as the moistureproof overwrap for the soluble packages are prepared from Type K Cellophane, E. I. du Pont de Nemours and Company, Wilmington, Del. The overwrap envelopes are made by the same method as for the soluble film packages by heat-sealing three edges except the films are cut to be ½–1 inch larger overall than the soluble film package which it contains.

The soluble film package is placed into the overwrap envelope and the fourth edge of the overwrap package heat-sealed. The following packages of pesticides are prepared.

Single Pesticide Packages:

| Pesticide | Soluble Package Contents |
|---|---|
| Lannate Methomyl Insecticide | 8 oz |
| Manzate Maneb Fungicide | 4 oz |
| Karmex Diuron Weed Killer | 16 oz |
| Hyvar X Bromacil Weed Killer | 16 oz |
| Sinbar Terbacil Weed Killer | 12 oz |
| Benlate Benomyl Fungicide | 50 g |

Fungicide Combination Packages:

| Soluble Package Contents | |
|---|---|
| Benlate Benomyl Fungicide | Manzate Maneb Fungicide |
| 4 oz | 4 oz |
| 3 oz | 12 oz |
| 4 oz | 12 oz |
| 50 g | 200 g |
| 50 g | 375 g |

The pesticides are not adversely affected by storage in the overwrapped water soluble packages, as shown by chemical analysis after accelerated storage tests at 45°C. for 21 days.

The packages are used to make up aqueous solutions or dispersions for spraying by conventional agricultural equipment by opening the outer wrap by tearing along a heat-sealed edge, inverting the open package, and allowing the inner packages to fall into a mixing tank containing water. The soluble packages dissolve completely in less than 3 minutes, allowing the pesticides to dissolve or disperse in the water. The resulting solution and slurries are pumped through fine screens (50 mesh) and fine nozzles (Unijet 1/4 T8003 made by Spraying Systems Co., Bellwood, Ill.) uses on agricultural spray equipment, and there is no evidence of any difficulty due to plugging of screens or nozzles. Examination of the screen showed no undissolved film or viscous gelatinous residues. The outer wrap, which is free from any contamination from the contents of the package, is disposed of by burning or burying without any risk of contaminating the environment.

I claim:

1. A 0.0005 to 0.010 inch thick, cold water-soluble self-supporting film consisting essentially of from 10 to 75 parts by weight of a polymer having a weight average molecular weight greater than about 120,000 selected from the group consisting of polyvinyl alcohol which is 87 to 99 mol percent hydrolyzed polyvinyl acetate and polyvinyl pyrrolidone and from 90 to 25 parts by weight of a polymer having a weight average molecular weight of less than about 90,000 selected from the group consisting of polyvinyl alcohol which is 87 to 99 mol percent hydrolyzed polyvinyl acetate and polyvinyl pyrrolidone and from 0 to 100 parts by weight per 100 parts polymer of a hydrophilic plasticizer, provided that if the first polymer is polyvinyl alcohol, the second polymer cannot be polyvinyl alcohol, and if the first polymer is polyvinyl pyrrolidone the second polymer cannot be polyvinyl pyrrolidone.

2. The film of claim 1 consisting essentially of from 25 to 35 parts by weight of a polymer having a weight average molecular weight greater than about 120,000 selected from the group consisting of polyvinyl alcohol which is 87 to 99 mol percent hydrolyzed polyvinyl acetate and polyvinyl pyrrolidone and from 75 to 65 parts by weight of a polymer having a weight average molecular weight of less than 50,000 selected from the group consisting of polyvinyl alcohol which is 87 to 99 mol percent hydrolyzed polyvinyl acetate and polyvinyl pyrrolidone and from 0 to 35 parts by weight of a hydrophilic plasticizer.

3. The film of claim 1 containing from 5 to 15 parts by weight plasticizer selected from the group consisting of dimethylformamide, dimethylacetamide, ethylene glycol, propylene glycol, glycerol and water-soluble polyglycols.

4. The film of claim 1 having a maximum dissolving time in water at 45°F. of 1 minute per 0.001 inch of film thickness.

5. The film of claim 1 having a thickness of from 0.001 to 0.005 inch.

6. The film of claim 1 consisting essentially of 30 parts by weight polyvinyl pyrrolidone having a weight average molecular weight of about 360,000, 70 parts by weight polyvinyl alcohol having a weight average molecular weight of about 21,000 which is from 88 to 90 mol percent hydrolyzed polyvinyl acetate, and 10 to 15 parts by weight of a plasticizer selected from the group consisting of glycerol and polyethylene glycol having a weight average molecular weight of about 400.

* * * * *